Dec. 16, 1952 J. P. BUTTERFIELD 2,621,639
ENGINE
Filed March 24, 1948 5 Sheets-Sheet 1
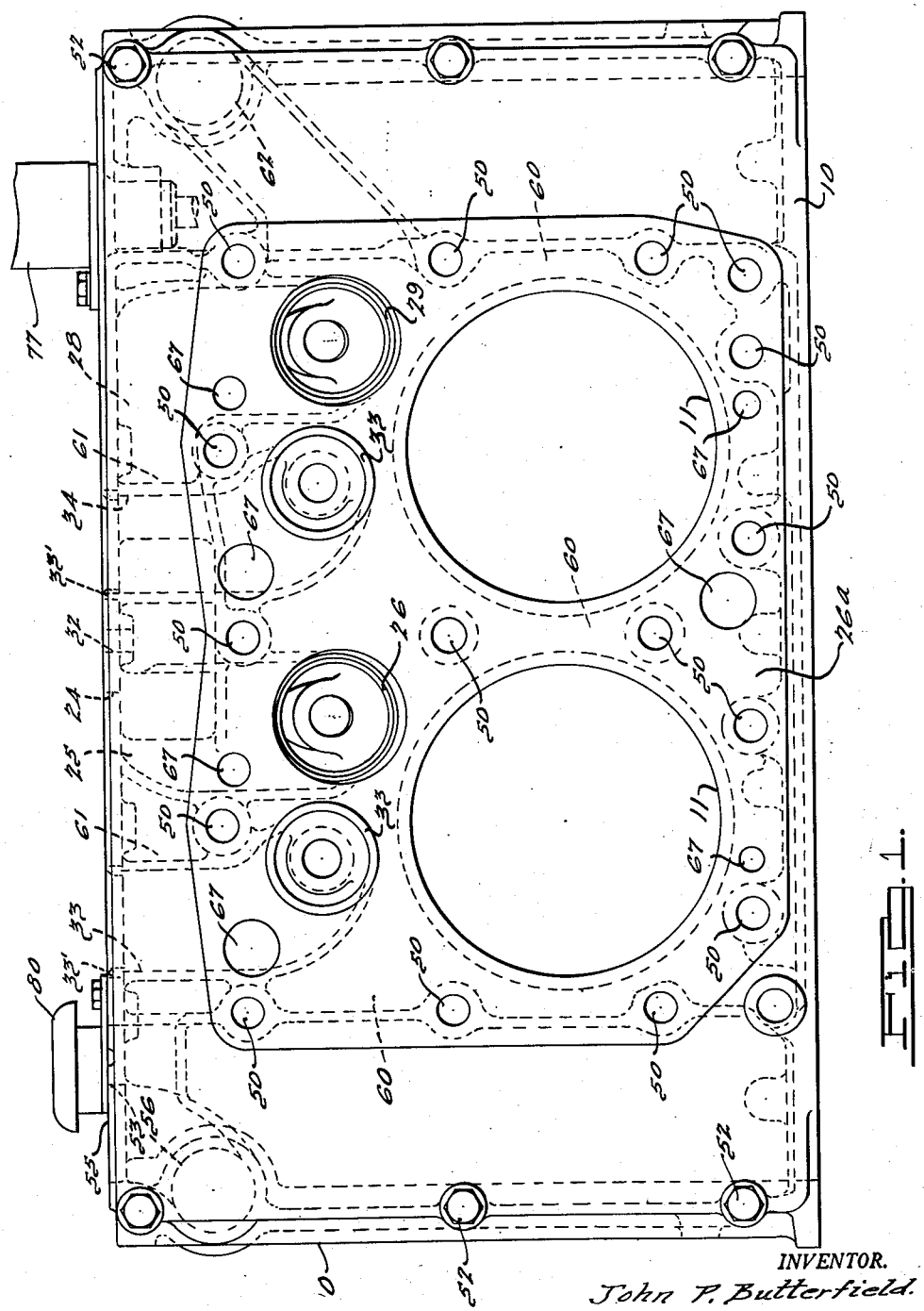
INVENTOR.
John P. Butterfield.
BY
Harness & Harris
ATTORNEYS.

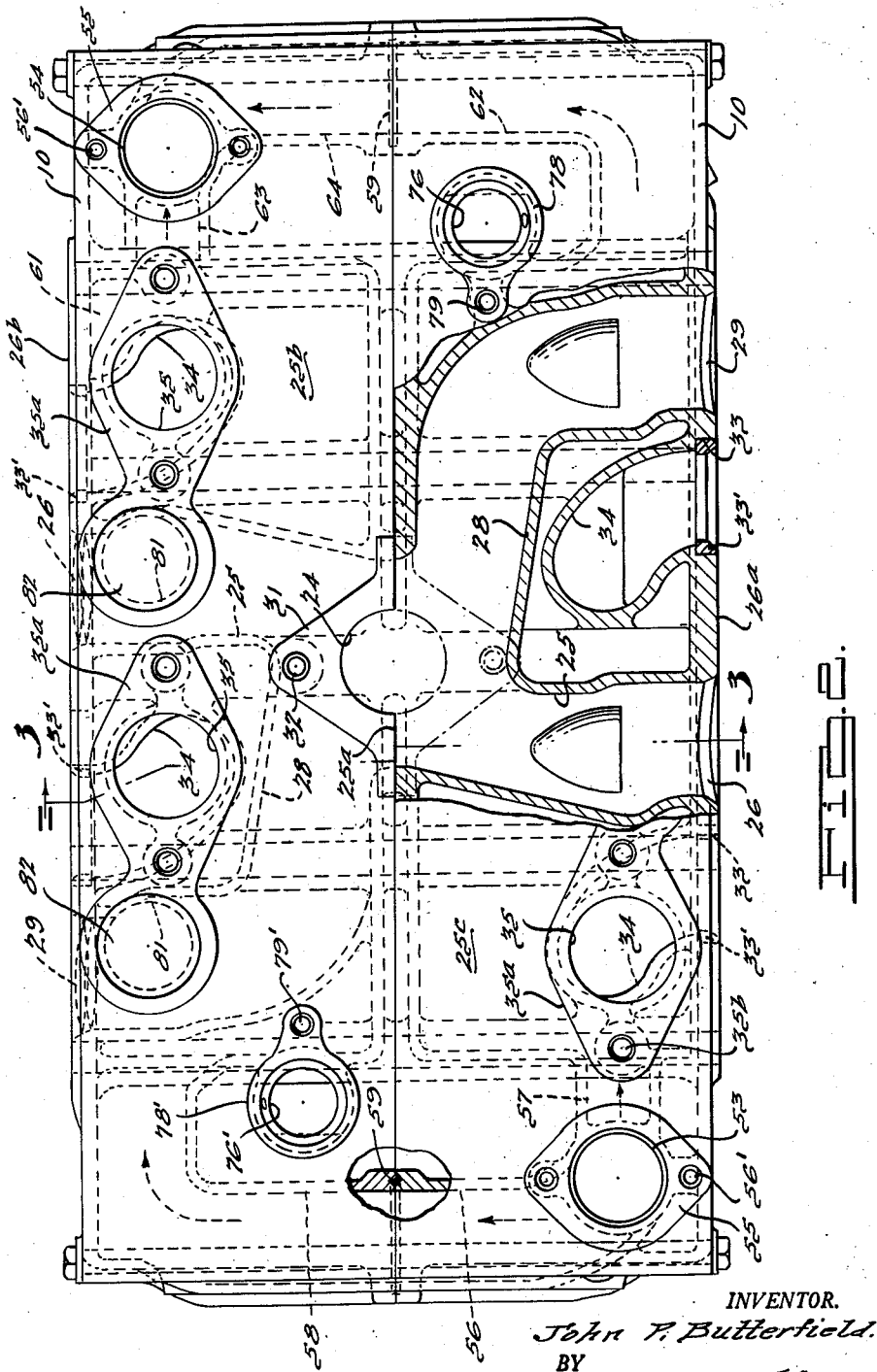

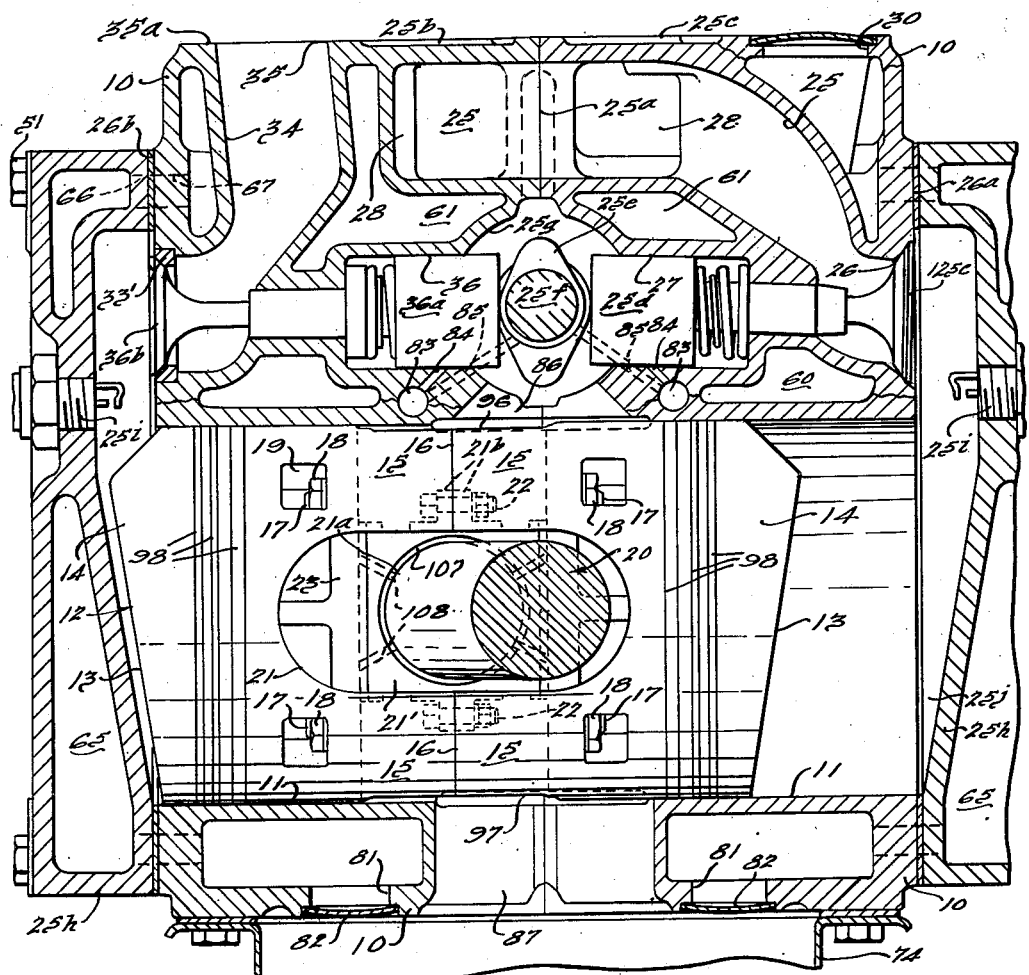
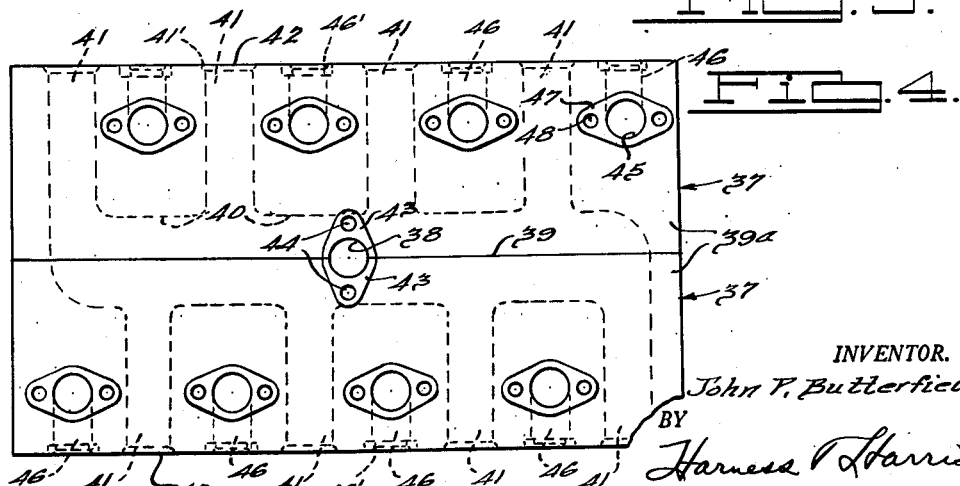

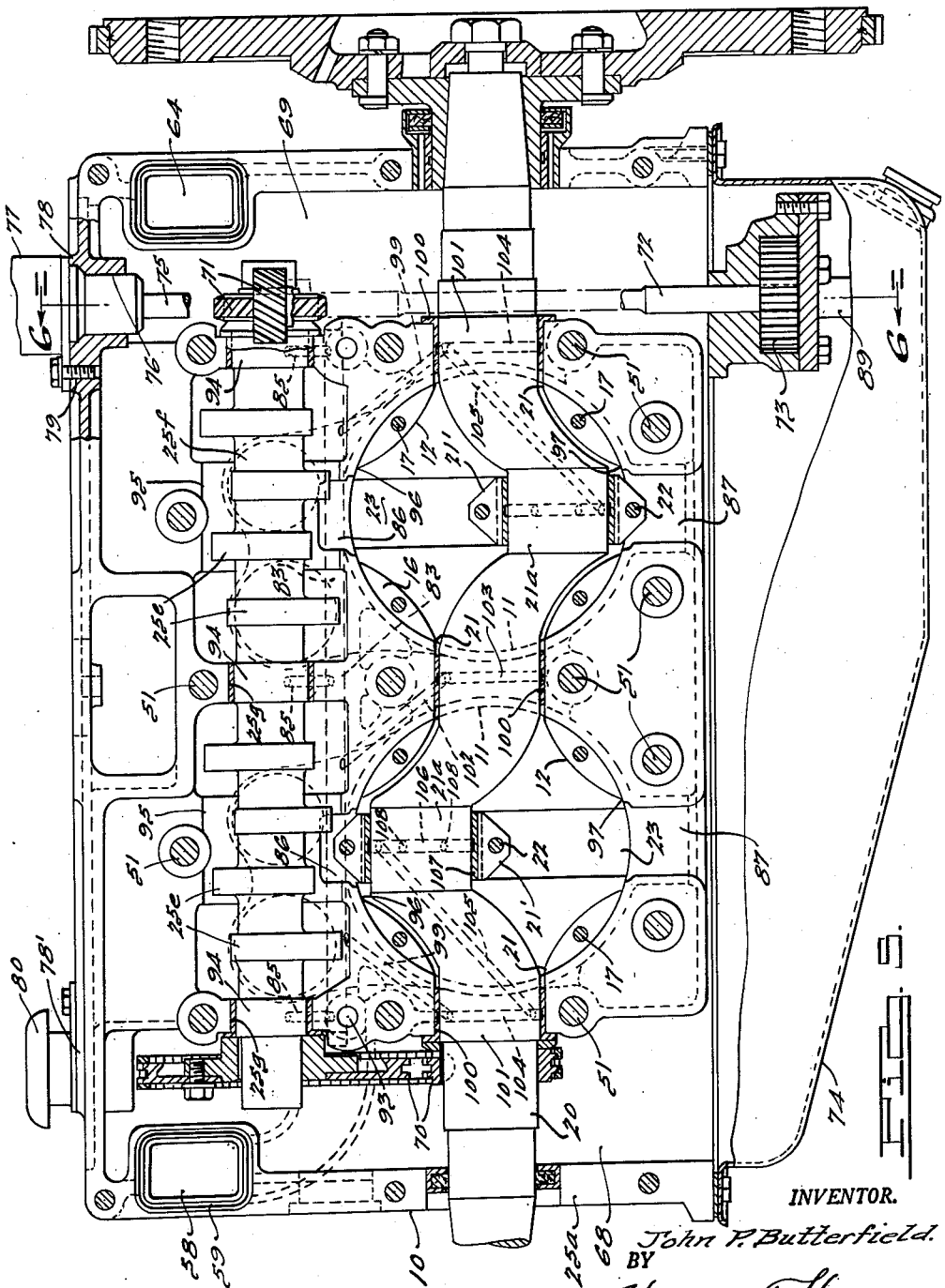

Patented Dec. 16, 1952

2,621,639

UNITED STATES PATENT OFFICE 2,621,639

ENGINE

John P. Butterfield, Grosse Pointe Woods, Mich., assignor to Chrysler Corporation, Highland Park, Mich., a corporation of Delaware Application March 24, 1948, Serial No. 16,650

6 Claims. (Cl. 123—56)

This application relates to engines and refers more particularly to improvements in engines of the double acting type having double-ended pistons provided with opposed pressure-receiving faces at their opposite ends and a crankshaft passing through the pistons.

One object of my invention is to provide an improved intake manifold for a double acting engine.

An important purpose of an engine of this type is reduction in size. When the engine is small, it is a problem to find space for various accessories that must be attached to the engine.

I have invented an arrangement that solves the problem of space for engine accessories by providing a single intake manifold inlet for a plurality of intake passages for the various combustion chambers of the engine to thereby accomplish a saving in the space that would otherwise be taken up by a multiplicity of inlets.

An object of the present invention is to increase the available space for accessories on an engine by providing a single intake manifold inlet to an engine cylinder block for a plurality of intake passages leading to the various combustion chambers. This arrangement is advantageously applied to an engine in which accessory space is limited because of smallness of the engine due to its comprising pistons having opposed pressure-receiving faces at their ends and a crankshaft passing through the pistons.

Another object is to provide an improved water circulating system for a double acting type of engine.

A further object is to provide a double acting engine having component interchangeable cylinder block portions.

Other objects are to provide a simple, novel, and effective system for lubricating the moving parts of the engine and to drain away the excess lubricant by utilizing many of the parts provided by my engine construction.

Other objects are to provide a novel accessory drive having improved utility; also improved means for admitting lubricating oil to the storage reservoir or oil pan.

Further objects and advantages of my invention will be more apparent from the following description of several embodiments of my invention, reference being made to the accompanying drawings in which:

Fig. 1 is a side view of an engine block according to the present invention;

Fig. 2 is a plan view of a pair of juxtaposed engine blocks with parts broken away;

Fig. 3 is a sectional view taken along the line 3—3 of Fig. 2 and showing the cylinder heads and valve gear of the engine;

Fig. 4 is a plan view of a pair of juxtaposed engine blocks of a modified form;

Fig. 5 is a longitudinal sectional elevational view approximately through the engine at the meeting faces of the cylinder block portions showing one of the block portions, a part of the other block portion being shown to illustrate the oil pump and distributer drive;

Figure 6:
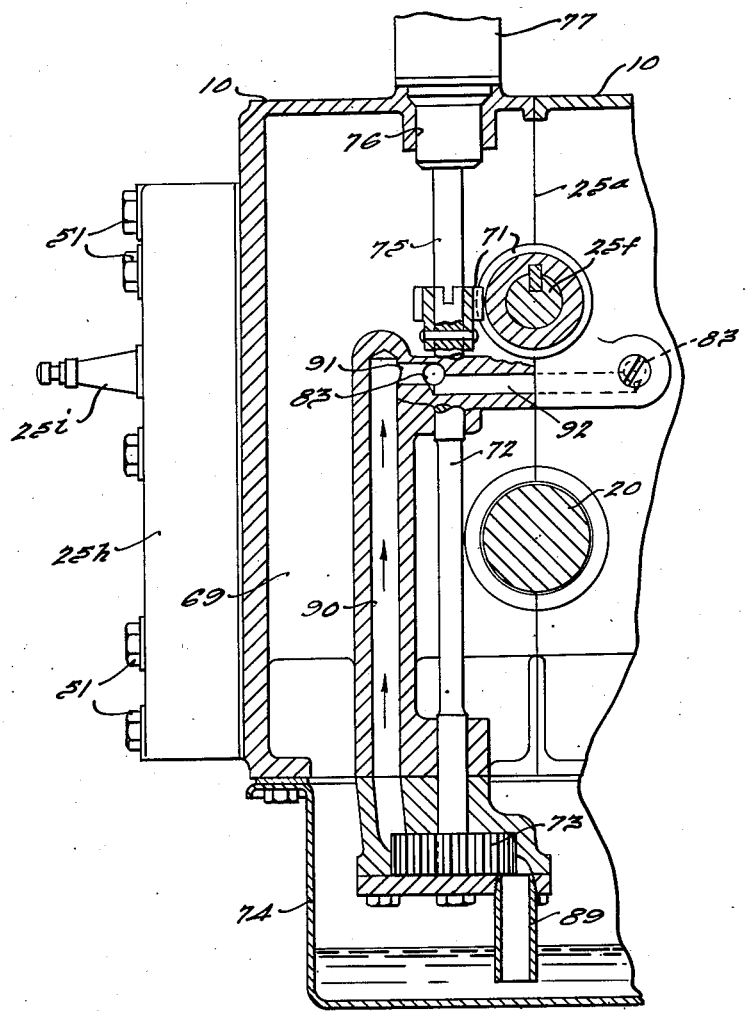
Fig. 6 is a sectional view showing the oil pump and distributer drive, as generally indicated by line 6—6 of Fig. 5.

Reference character 10 designates component or complementary engine blocks juxtaposed so that cylindrical openings 11 for pistons are aligned, as shown in Fig. 3. Fig. 1 shows that there are two openings 11 in each block 10. Mounted in each pair of aligned cylindrical openings 11 is a double-ended piston 12 having pressure faces 13 at its opposite ends. Each piston 12 is composed of complementary parts 14 having skirt projections 15 abutting on lines 16. The piston parts 13 are secured to one another by four bolts 17 extending through the skirts 15 and nuts 18 in threaded engagement with both ends of each bolt. The nuts 18 are applied to the bolt ends through openings 19 in the piston skirts. A crankshaft 20 extends through openings 21 formed in the piston 14 between adjacent skirt projections 15. An offset portion 21a of the crankshaft is journalled in a slide head 21' formed of complementary parts 21b secured together by bolts 22. The slide head parts 21b are journalled in slideway portions 23 formed on the piston parts 13 so that the slide head moves back and forth as viewed in Fig. 3, as the piston 12 reciprocates horizontally, as viewed in the same figure.

As seen in Fig. 2, the assembled cylinder blocks 10 mate to provide a common intake opening 24, formed half in a meeting end face 25a and the adjacent portion of a top side or boundary face 25b of one block and the other half in a meeting end face 25a and the adjacent portion of a top side or boundary face 25c of the other block. The lower cylinder block, as seen in Fig. 2, has an intake passage 25 leading from the common intake 24 and terminating in a seat 26 for an intake valve 125c operated by a spring opposed tappet or follower 25d slidable in the guide 27 cast in the block. The tappet is operated by one of the illustrated cams 25e of camshaft 25f journalled in suitable bearings fitted in the companion semi-cylindrical openings 25g of the blocks 10. The seat 26 is in a side 26a at the right side in Fig. 3, at which a cylinder head 25h is attached. This cylinder head carries the usual spark plugs 25i and has combustion chambers 25j overlying the adjacent ends of cylinders 11 and the intake and exhaust valves for such cylinders. As seen in Fig. 2, a second intake passage 28 leads from the common inlet 24 to an intake valve seat 29 in the side 26a, adapted to cooperate with the second cylinder in the lower block 10 of Fig. 2. Similar inlet passages 25 and 28 lead from the common intake 24 to corresponding intake valve seats 26 and 29 in the head side 26b of the upper cylinder block 10, as viewed in Fig. 2. A second cylinder head 25h is attached to the side 26b, this cylinder head being like the one aforesaid. Each block 10 is provided in its top side 25b and 25c with a half-portion of a boss 31 surrounding the common inlet opening 24 against which a fitting from a carburetor fuel mixture supply line leading to the inlet opening 24 is to be abutted. The fitting is to be attached to each portion of boss 31 by means of a screw engaging an opening 32 in each boss portion.

It will be understood that the right hand block 10 in Fig. 3 (upper block as viewed in Fig. 2) has, associated with each of its cylinders 11 and combustion chambers 25j, an intake valve 125c just like the intake valves for the other block 10.

Each companion half-portion 10 of the cylinder block assembly is formed with exhaust gas passages and exhaust valve seats for conducting the exhaust gas from each of the engine cylinders 11. Thus the left hand block 10 of Fig. 3 (lower block as viewed in Fig. 2) is provided with exhaust valve-receiving openings 33 adapted to be fitted with conventional valve seat inserts 33'. Each of these openings 33 leads inwardly and upwardly of this block by a cast exhaust gas passage 34 terminating in an opening 35 bounded by a boss 35a having tapped openings 35b for receiving fasteners for the conventional flange of the branch portion of a conventional exhaust manifold (not shown). This block 10 and also the other block (see Fig. 3) has the cast guideways 36 for slidably receiving the spring pressed tappets or followers 36a associated with one of the cams 25e for operating the exhaust valve 36b. As indicated by the similar reference characters in the drawings, the right hand block in Fig. 3 has exhaust valve openings and passages just as recited above for the other block and functioning in the same manner.

The blocks 10 have a series of holes or passages 50 extending therethrough parallel with the axis of each cylinder 11, the holes 50 being aligned in the blocks 10 to receive the through-bolt assemblies 51 which also extend through the cylinder heads 25h and have headed ends seating on the outer faces of these cylinder heads. These bolts serve to hold the blocks 10 and cylinder heads 25h in assembled relationship and thus also confine the crankshaft 20, camshaft 25f and parts associated therewith in their proper operating positions. Additional bolts 52 pass through the blocks 10 adjacent the ends of the cylinder heads 25h.

It will be noted that the pairs of intake valve openings 26 and 29 on opposite sides of blocks 10 for the same cylinder 11 are relatively offset from each other in the direction of the axis of the camshaft 25f and crankshaft 20 to accommodate operation of the associated intake valves by separate cams 25e. Likewise the exhaust valves 36b and seats 33' for the ends of the same cylinder 11 are offset in the same direction. Furthermore the intake passages 28 and 25 as well as the exhaust passages 34 for the same cylinder are staggered or offset in the direction of the axis of the crankshaft and camshaft, viz., longitudinally of the engine. In the illustrated engine the blocks 10 are identical with each other and interchangeable with each other, this having the advantage of lessening the cost of manufacturing the engine and facilitating servicing the engine since if it becomes necessary to replace either one of the blocks 10 then this may be done very economically inasmuch as only one type of block need be kept on hand for service requirements.

Where the blocks 10 are similar to each other as illustrated, each block has at its upper face adjacent one end thereof a water or coolant opening 53, 54 bounded by a boss 55 having tapped holes 56' for attachment of a water pipe so that a coolant may be circulated under the usual pressure to and from the blocks 10 and cylinder heads 25h, one of the openings admitting the coolant and the other ejecting it. Thus water is admitted at opening 53 whence it flows in paths provided by cored block passages 56 and 57 as indicated by the dotted arrows in Fig. 2.

From passage 56 the water passes to an aligned passage 58 in the adjacent block, a gasket 59 placed in component half-portions of a groove in the abutting faces of blocks 10 preventing leakage of water into the cylinder 11. From passages 58 and 57 the water flows through cored intercommunicating passages 60 surrounding the cylinder portions 11 of each block, and through cored passages 61 around the valve guides 27 and 36 and around the intake and exhaust passages 25 and 28 to the passages 62, 63. From passage 63 the water flows to outlet 54 and from passage 62 the water flows across the faces of the abutting blocks 10 to passage 64 thence to outlet 54, another gasket 59 effecting a water seal between passages 62 and 64.

Each cylinder head 25h has a cored coolant chamber 65 and water openings 66 which register with openings 67 (Fig. 1) in the side faces 26a and 26b of blocks 10 so that water is circulated from the block passages 60 and 61 through the cylinder heads. Apart from the water headers 56, 58 and 62, 64 the water does not cross the face contact 25a of blocks 10, one block 10 having a water inlet 53 and the other having the outlet 54.

The blocks 10 are provided with component housing portions providing an enlarged chamber 68, 69 at the opposite ends of the engine. In chamber 68 there is located the drive 70 for camshaft 25f from the crankshaft 20 and in chamber 69 there is located a camshaft drive at 71 to a shaft 72 extending downwardly to the oil pressure pump 73 in the oil reservoir in pan 74 attached to the bottom of blocks 10 and open to chambers 68 and 69. Shaft 72 has an upward extension 75 journalled in opening 76 (Fig. 2) in block face 25c for driving a distributor 77. The opening 76 is bounded by a boss 78 having the attachment tapped hole 79, the primed numerals 76', 78', and 79' indicating the parts corresponding to 76, 78, and 79 for the other block 10. Fitted to boss 78' is a breather 80 removable to expose opening 76' through which oil is poured for flow through chamber 68 to the pan 74. Various core openings 81 in blocks 10 are closed by conventional core plugs or disks 82.

The pressure lubrication system comprises the oil pump 73 which draws lubricant at its inlet pipe 89 from pan 74 and delivers the oil under pressure upwardly in the passage 90 whence the oil flows by a passage 91 to the gallery 83 of that block which carries the passage 90, and by a second passage 92 across the meeting faces at 25a of the block portions 10 to the other gallery 83 of the other block. At the front end of the engine the galleries 83 are also connected by a passage 93 similar to passage 92. It will be understood that only one block portion carries the oil pump 73 although where it is desired to maintain interchangeability of block portions 10, the other block portion is provided with the same passages as shown in Fig. 6 so that either block portion may be fitted with the oil pump and used to deliver the oil. Such passages as are not used in the particular block portion that does not carry the pump may be readily blocked off by suitable plugs at any points where the oil pressure would otherwise be lost by venting the system to the oil pan.

Between the journal portions 94 of the camshaft the block portions are formed with a cam chamber 95 which accommodates operation of the cams 25e and into which the tappet guides 27 and 36 open for oil drainage. The cam chambers 95 are formed by mating recesses in the block portions at their meeting faces.

From the galleries 83 the oil is conducted by passages 84 to the various tappets 25d and 36a and by passages 85 to the bearings for the camshaft journal portions 94. Excess lubricant flows from these points or locations into the cam chambers 95, one of which is above each cylinder bore, whence the oil flows downwardly through an opening 86 into each cylinder bore thence through the upper of the piston slideway openings 96, 97 and down through the hollow central chamber portion of each piston 12 and then through the lower slideway opening 97 of the piston and through opening 87 to oil pan 74.

Openings 86 and 87 are formed by the mating recessed half-portions in the blocks 10 and are of such length as to always communicate with the piston openings 96, 97, respectively. The openings 86, 87 and 96, 97 are necessary to accommodate the travel of the slidehead or bearing block 21' in the slideway 23 when the piston 12 is moving in the region of its mid-stroke as seen in Fig. 5. Thus the openings 86, 87 necessary to accommodate the sweep of the bearing block 21' are utilized to drain the lubricant. It will be apparent that the piston rings 98 always seal the openings 86, 87 against communication with the combustion chambers 25j. Each cam chamber 95 is in constant communication with oil pan 74 for oil drainage at 86, 96, through the hollow piston, and openings 97, 87.

Lubricant from one or both galleries 83 flows under pressure through the block passages 99 to the bearings 100 for the crankshaft end journals 101 and by a passage 102 to lubricate the bearing 100 for the intermediate journal portion 103 of the crankshaft.

The end bearings 100 have an annular oil collector groove 104 communicating with their supply passage 99, each groove 104 communicating with a drilled crankshaft passage 105 leading to the annular oil groove 106 of a bearing 107 for a crank 21a and its associated bearing block 21'. From the groove 106 at each crank bearing oil is supplied under pressure through the bearing 107 and bearing block portions 21b through passages 108 to lubricate the engaged bearing surfaces between block 21' and piston slideway portions 23.

Excess lubricant from the crankshaft bearings 100 is free to drain through openings 21 in each piston and thence through the piston hollow chambered interior and down through openings 97, 87 to oil pan 74. Likewise lubricant from each crank journal and bearing block and slideway drains downwardly in the associated hollow piston to the oil pan.

Fig. 4 diagrammatically shows a modified engine in which each of two mating blocks 37 has formed therein half of an intake manifold inlet opening 38 formed at its meeting faces 39 which are also the meeting faces of the top sides 39a of the blocks 37 and half of an inlet header passage 40 from which extend four fuel inlet branch passages 41 in each block 37. Each fuel inlet passage terminates in a seat 41' for an intake valve on a side 42 of a block 37, to which a cylinder head is to be attached. Each block 37 has a cylinder similar to the Fig. 1 embodiment for each of the four inlet branch passages 41. Each cylinder is served by an inlet branch passage 41 of each block 37. The engine is of the type shown in Fig. 3, in which the piston has pressure faces at both ends and the crankshaft extends through the piston. A half portion of boss 43 is formed on each block 37 around the opening 38 as in Fig. 3 and is adapted to be abutted by the aforesaid fuel mixture supply line. Openings 44 in the bosses are to be engaged by screws fastening the fitting to the bosses as for Fig. 2. In each block 37 there are four exhaust outlet openings 45 from which extend passages 46 to seats 46' for exhaust valves in the head side 42 similar to the Fig. 2 arrangement. Each outlet 45 is surrounded by a boss 47, which is to receive in abutting relation a fitting on an exhaust manifold of conventional type held against the boss by screws engaging openings 48 in the boss 47. The blocks 37 are cored for water circulation and, apart from the differences in the intake and exhaust gas passages, are constructed similarly to the blocks of the principal embodiment, Fig. 4 being a diagrammatic showing in which the details have been omitted.

Features of novelty disclosed in the subject application but not claimed herein are more particularly described and claimed in the copending application of Alexander G. Herreshoff, Serial No. 16,801 filed March 24, 1948, in my copending applications, Serial Nos. 16,645, 16,646, 16,648, and 16,649 filed March 24, 1948, and Patent No. 2,571,198.

I claim:

1. In combination, a cylinder block comprising a pair of engine blocks held together and having end faces meeting one another in a plane extending longitudinally of the engine, each block having openings for pistons extending generally transversely to its meeting end face and in alignment with corresponding openings for pistons in the other block, each block having interiorly disposed fuel intake passages for the plurality of piston openings in that block branching out from a common exteriorly disposed, sectionalized cavity formed adjacent one side of and in the meeting end face of that block, the common cavity sections in the end faces of the blocks cooperating to form a common inlet for the said intake passages in one block and the said intake passages in the other block.

2. A cylinder block structure for an engine of the opposed type comprising, in combination, a pair of blocks extending longitudinally of the engine and adapted to be secured together in face contact relationship, said block structure having a plurality of cylinders each having a component portion thereof extending transversely through one of said blocks, each of said blocks having a pair of intake and exhaust valve-receiving openings in an outer boundary face thereof adjacent an end of each of said component cylinder portions, said block structure having an outer boundary face disposed transversely of said block faces and having component face portions thereof on each of said blocks, said blocks being formed with passage means for conducting exhaust gas from said exhaust valve-receiving openings to said transversely disposed face of the block structure, said transversely disposed face having an intake gas opening component portions of which are formed in each of said component face portions, each of said blocks having intake gas conducting passages therein between said intake gas opening and said intake valve-receiving opening.

3. A cylinder block structure for an engine of the opposed type comprising, in combination, a pair of blocks extending longitudinally of the engine and adapted to be secured together in face contact relationship, said block structure having a plurality of cylinders each having a component portion thereof extending transversely through one of said blocks, each of said blocks having a pair of intake and exhaust valve-receiving openings in an outer boundary face disposed transversely of said block faces and having component face portions thereof on each of said blocks, each of said component face portions being provided with a plurality of exhaust gas openings and a component portion of an intake gas opening, each of said blocks having passage means formed therein for placing said intake gas opening in communication with said intake valve-receiving openings of said blocks and each of said blocks having other passage means for placing its said exhaust valve-receiving openings respectively in communication with its said exhaust gas openings.

4. A cylinder block structure for an engine of the opposed type comprising, in combination, a pair of cylinder blocks extending longitudinally of the engine and adapted to be secured together in face contact relationship along an inner end face thereof, said block structure having a plurality of cylinders each having a component portion thereof extending transversely through one of said blocks normal to said contacting inner end faces, each of said blocks having a pair of intake and exhaust valve-receiving openings in an outer end face thereof adjacent an end of each of said component cylinder portions, the intake valve-receiving openings adjacent opposite ends of the same cylinder being offset with respect to one another in a direction longitudinally of the engine, the exhaust valve-receiving openings adjacent opposite ends of the same cylinder being offset with respect to one another and with respect to said intake valve receiving openings in a direction longitudinally of the engine, said block structure having an outer boundary face disposed transversely of said block end faces and having component face portions thereof on each of said blocks, said blocks being formed with integral passage means for conducting exhaust gas from said exhaust valve-receiving openings to said transversely disposed boundary face of the block structure, said transversely disposed boundary face having an intake gas opening component portions of which are formed in each of said component contacting end face portions, each of said blocks having integral intake gas conducting passages therein extending between said intake gas opening and said intake valve-receiving opening.

5. A cylinder block structure for an engine of the opposed type comprising, in combination, a pair of cylinder blocks extending longitudinally of the engine and adapted to be secured together in face contact relationship along an inner end face thereof, said block structure having a plurality of cylinders each having a component portion thereof extending transversely through one of said blocks normal to said contacting inner end faces, each of said blocks having a pair of intake and exhaust valve-receiving opening in an outer end face thereof adjacent an end of each of said component cylinder portions, the intake valve-receiving openings adjacent opposite ends of the same cylinder being offset with respect to one another in a direction longitudinally of the engine, the exhaust valve-receiving openings adjacent opposite ends of the same cylinder being offset with respect to one another and with respect to said intake valve receiving openings in a direction longitudinally of the engine, said block structure having an outer boundary face disposed transversely of said block end faces and having component face portions thereof on each of said blocks, each of said component boundary face portions being provided with a plurality of exhaust gas openings within the periphery thereof and a component portion of an intake gas opening along the inner end face edge thereof, each of said blocks having integral passage means formed therein for placing said intake gas opening in communication with said intake valve-receiving openings of said blocks, said intake gas passage means comprising a common header passage in the block inner end face extending longitudinally of the block and a plurality of branch passages extending transversely from the header passage to each of the intake valve receiving openings, and each of said blocks having other integral passage means for placing one of said exhaust valve-receiving openings respectively in communication with one of said exhaust gas openings.

6. In an engine of the double acting type comprising, in combination, a cylinder block structure comprising component block portions having opposed end faces brought together in face contact in a plane extending longitudinally of the engine, said block structure having a plurality of cylinders extending transversely of said plane and opening at opposite sides of said structure, each of said cylinders having component portions thereof formed in said block portions and communicating with each other at said plane of face contact, a double-ended piston structure operable in each of said cylinders, a cylinder head structure mounted on each of the exposed end faces of said block structure, a crankshaft mounted in said block structure and extending transversely through each of said pistons, a camshaft mounted in said block structure and driven from said crankshaft for rotation about an axis parallel with the axis of said crankshaft, each of said block structures having pairs of component openings formed in their contacting end faces for respectively rotatably mounting said crankshaft and camshaft, each of said block portions having a pair of intake and exhaust valve-receiving openings in the exposed end faces thereof adjacent an end of each of said cylinders, intake and exhaust valves respectively operably disposed in said intake and exhaust valve-receiving openings, means operably connecting said valves with said camshaft, each of said block portions having a boundary face extending transversely between the block end faces and provided with a plurality of exhaust gas openings therein, and a component portion of an intake opening formed in the block inner end face and arranged to provide a common opening for fuel supply to the pistons each of said block portions having interiorly disposed exhaust gas passages formed therein and respectively disposed to extend between its said exhaust valve-receiving openings and its said exhaust gas openings, each of said block portions having interior passage means formed therein for conducting intake gas from said common fuel intake opening to its said intake valve-receiving openings.

JOHN P. BUTTERFIELD.

REFERENCES CITED

The following references are of record in the file of this patent:

UNITED STATES PATENTS

| Number | Name | Date |
|---|---|---|
| 1,000,128 | Swain | Aug. 8, 1911 |
| 1,018,532 | Twombly | Feb. 27, 1912 |
| 1,128,917 | Tomasini | Feb. 16, 1915 |
| 1,140,292 | Sharpneck et al. | May 18, 1915 |
| 1,215,383 | Kenyon | Feb. 13, 1917 |
| 1,254,281 | Salway | Jan. 22, 1918 |
| 1,287,797 | Tietzmann | Dec. 17, 1918 |
| 1,710,721 | Bosmans | Apr. 30, 1929 |
| 1,853,712 | Woolson | Apr. 12, 1932 |
| 1,953,198 | Snyder | Apr. 3, 1934 |
| 1,998,723 | Irgen | Apr. 23, 1935 |
| 2,046,797 | Swan | July 7, 1936 |
| 2,093,433 | Greene | Sept. 21, 1937 |
| 2,152,594 | Klotsch | Mar. 28, 1939 |
| 2,166,398 | Doman | July 18, 1939 |
| 2,170,099 | Stubings | Aug. 22, 1939 |
| 2,243,818 | Herrmann | May 27, 1941 |
| 2,243,819 | Herrmann | May 27, 1941 |
| 2,293,352 | Molina | Aug. 18, 1942 |
| 2,338,084 | Edmunds | Jan. 4, 1944 |